(12) United States Patent
James

(10) Patent No.: US 8,194,135 B2
(45) Date of Patent: Jun. 5, 2012

(54) RENDERING UNOBSTRUCTED VIEWS IN A GAMING ENVIRONMENT

(75) Inventor: Gavin Michael James, Santa Monica, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 802 days.

(21) Appl. No.: 12/237,274

(22) Filed: Sep. 24, 2008

(65) Prior Publication Data

US 2009/0189895 A1 Jul. 30, 2009

Related U.S. Application Data

(60) Division of application No. 11/222,883, filed on Sep. 8, 2005, now Pat. No. 7,679,642, which is a continuation of application No. 10/268,495, filed on Oct. 9, 2002, now Pat. No. 6,995,788.

(60) Provisional application No. 60/328,488, filed on Oct. 10, 2001.

(51) Int. Cl.
*H04N 5/225* (2006.01)

(52) U.S. Cl. ........ 348/169; 348/113; 348/116; 348/143; 348/157; 348/158; 348/159; 348/135; 345/419; 345/418

(58) Field of Classification Search ............... 348/169, 348/113, 116, 143, 157, 158, 159, 135; 345/419, 345/418

See application file for complete search history.

(56) References Cited

U.S. PATENT DOCUMENTS

| | | | |
|---|---|---|---|
| 4,969,036 A | 11/1990 | Bhanu et al. | |
| 5,526,041 A | 6/1996 | Glatt | |
| 5,798,519 A * | 8/1998 | Vock et al. | 250/206.1 |
| 6,034,692 A | 3/2000 | Gallery et al. | |
| 6,181,988 B1 | 1/2001 | Schneider et al. | |
| 6,489,955 B1 | 12/2002 | Newhall, Jr. | |
| 6,680,746 B2 | 1/2004 | Kawai et al. | |
| 6,714,236 B1 * | 3/2004 | Wada et al. | 348/152 |
| 6,995,788 B2 | 2/2006 | James | |

* cited by examiner

*Primary Examiner* — Shawn An

(74) *Attorney, Agent, or Firm* — Lewis and Roca LLP

(57) ABSTRACT

A system and method for rendering unobstructed views in a gaming environment are provided. The system includes a memory for storing a camera navigation/control model, a central processing unit for executing the camera navigation/control model to provide unobstructed and non-disorienting target character views, and a graphics processing unit configured to render the unobstructed views of the target in an image for display. In addition, the camera navigation/control model includes an object detection model, line-of-sight restoration models to restore a line-of-sight view of an obstructed target, and a camera navigation path model. A line-of-sight restoration method is used to move the camera to provide an unobstructed view of the target.

17 Claims, 11 Drawing Sheets

200

RENDERING UNOBSTRUCTED VIEWS IN A GAMING ENVIRONMENT

CROSS-REFERENCE TO RELATED APPLICATIONS

This application is a divisional and claims the priority benefit of U.S. patent application Ser. No. 11/222,883 filed Sep. 8, 2005, now U.S. Pat. No. 7,679,642, which is a continuation and claims the priority benefit of U.S. patent application Ser. No. 10/268,495 filed Oct. 9, 2002, now U.S. Pat. No. 6,995,788, which claims the benefit of U.S. provisional patent application No. 60/328,488 filed Oct. 10, 2001, the disclosure of the aforementioned applications being incorporated herein by reference.

BACKGROUND OF THE INVENTION

1. Field of the Invention

This invention relates generally to gaming environments and more particularly to a system and method for rendering unobstructed views in a gaming environment.

2. Description of the Related Art

Camera navigation in a gaming environment poses many challenges for game developers. Game cameras provide players with multiple views of game characters. It is important that the cameras provide a player with unobstructed views that provide clear information on a character's surrounding environment. The player uses the information provided by the multiple cameras to decide how the character responds to game situations. However, camera navigation in games can be complicated, particularly in games with twisty passages, narrow paths, and with obstacles such as trees and rocks, for example. In such games, line-of sight obstacles may frequently obscure the player's view.

Camera navigation is further complicated in action, adventure, or exploration games in which characters move quickly and in many directions. Quick character motion typically includes complex motion, such as motion of characters engaged in combat. Cameras need to be optimally positioned to enable the player to clearly see the game, and to allow the player to base character control decisions upon sensory information obtained from the multiple views. However, games that involve quick translations in camera location, quick rotations in camera orientation, or scene cuts from one camera with a given orientation to a second camera with an incongruous orientation, may disorient the player. Therefore, game designers must design camera navigation systems based on multiple constraints: physical constraints of the players and geometric constraints of the game.

It would be advantageous to implement a camera navigation system that balances the multiple constraints placed on the cameras, and provides game players with clear, non-disorienting views of game characters.

SUMMARY OF THE INVENTION

Systems and methods are provided for rendering unobstructed views in a gaming environment. Camera navigation/control models may be stored. A camera position may be selected to avoid objects which obstruct line-of-sight to a target. The selection of the camera position is based on one of the stored camera navigation/control models. The selected camera position allows for an unobstructed view of the target. The unobstructed view may be rendered, captured, and displayed.

Various embodiments of the present invention include systems for rendering unobstructed views in a gaming environment. Such systems may include a memory for storing a camera navigation/control model, a central processing unit for selecting a camera position for avoiding objects which obstruct a line-of-sight view of a target in accordance with the camera navigation/control model, and a graphics processing unit for rendering an unobstructed view of the target in an image for display, the unobstructed view captured by the camera at the selected camera position.

Further embodiments include methods for rendering unobstructed views in a gaming environment. Such methods may include storing a camera navigation/control model, selecting a camera position for avoiding objects which obstruct a line-of-sight view of a target in accordance with a stored camera navigation/control model, rendering an unobstructed view of the target, capturing the unobstructed view of the target, and displaying the unobstructed view of the target.

Some embodiments of the present invention further include computer-readable media having embodied thereon programs to perform methods for rendering unobstructed views in a gaming environment.

DETAILED DESCRIPTION

A system and method of camera navigation that renders unobstructed views of a gaming environment is described herein. Physical player constraints and game geometry constraints may be balanced to produce an unobstructed, non-disorienting view for the game player. Various embodiments of the invention are disclosed, such as prioritized entry points to a main rendering camera, selection of a camera navigation configuration, control of a camera rotation speed, obstacle detection and avoidance, emergency line-of-sight restoration, and smoothing of a camera navigation path.

Figure 1:
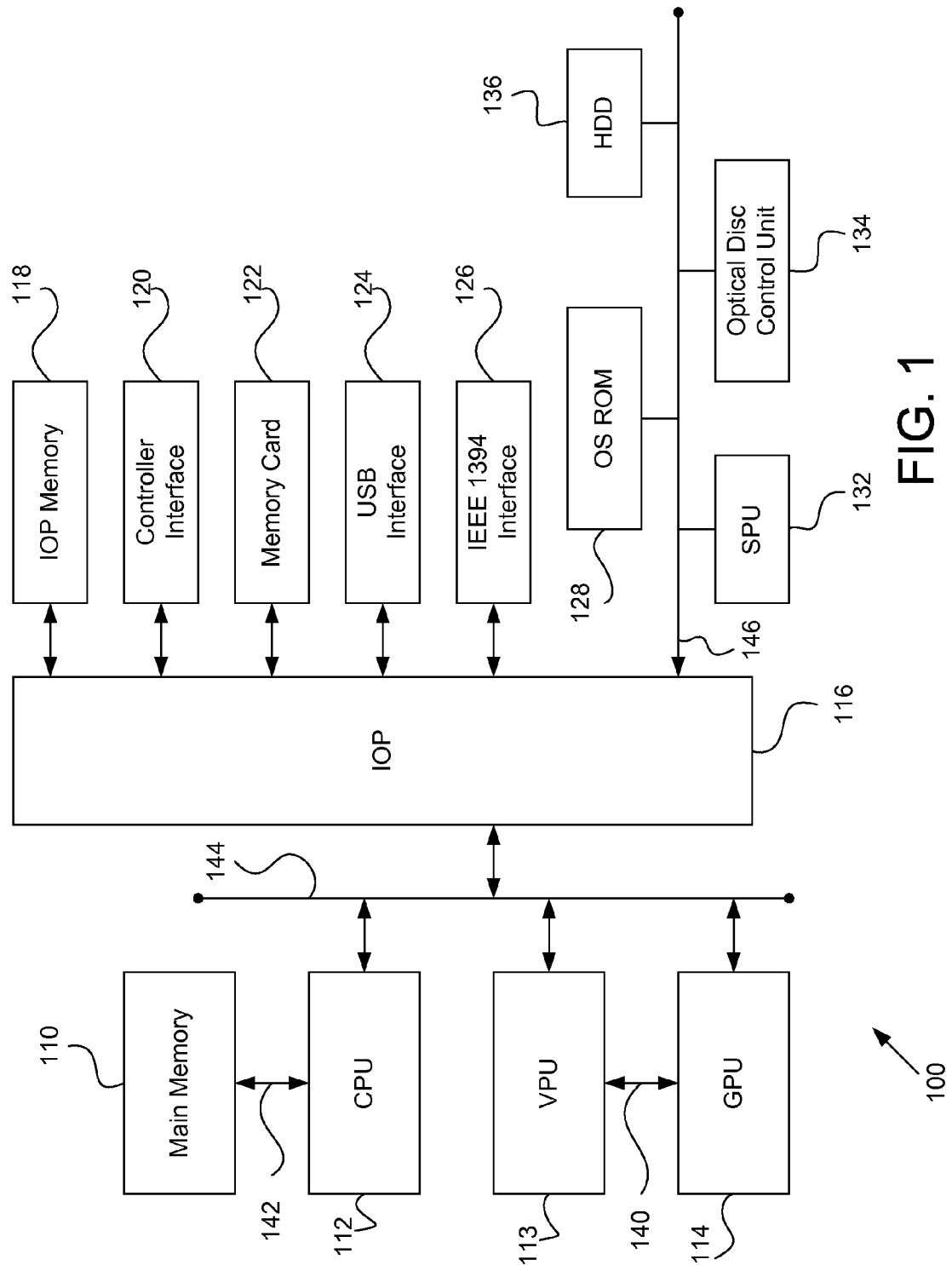
FIG. 1 is a block diagram of an electronic entertainment system, according to one embodiment of the invention.

FIG. 1 is a block diagram of an electronic entertainment system 100, according to one embodiment of the invention. System 100 includes, but is not limited to, a main memory 110, a central processing unit (CPU) 112, a vector processing unit (VPU) 113, a graphics processing unit (GPU) 114, an input/output processor (IOP) 116, an IOP memory 118, a controller interface 120, a memory card 122, a Universal Serial Bus (USB) interface 124, and an IEEE 1394 interface 126. System 100 also includes an operating system read-only memory (OS ROM) 128, a sound processing unit (SPU) 132, an optical disc control unit 134, and a hard disc drive (HDD) 136, which are connected via a bus 146 to IOP 116.

CPU 112, VPU 113, GPU 114, and IOP 116 communicate via a system bus 144. CPU 112 communicates with main memory 110 via a dedicated bus 142. VPU 113 and GPU 114 may also communicate via a dedicated bus 140.

CPU 112 executes programs stored in OS ROM 128 and main memory 110. Main memory 110 may contain pre-stored programs and may also contain programs transferred via IOP 116 from a CD-ROM or DVD-ROM (not shown) using optical disc control unit 134. IOP 116 controls data exchanges between CPU 112, VPU 113, GPU 114 and other devices of system 100, such as controller interface 120.

Main memory 110 includes, but is not limited to, a program having game instructions including a camera navigation/control model. The program is preferably loaded from a DVD-ROM via optical disc control unit 134 into main memory 110. CPU 112, in conjunction with VPU 113, GPU 114, and SPU 132, executes the game instructions and generates rendering instructions in accordance with the camera navigation/control model. GPU 114 executes the rendering instructions from CPU 112 and VPU 113 to produce images for display on a display device (not shown). The user may also instruct CPU 112 to store certain game information on memory card 122. Other devices may be connected to system 100 via USB interface 124 and IEEE 1394 interface 126.

Figure 2:
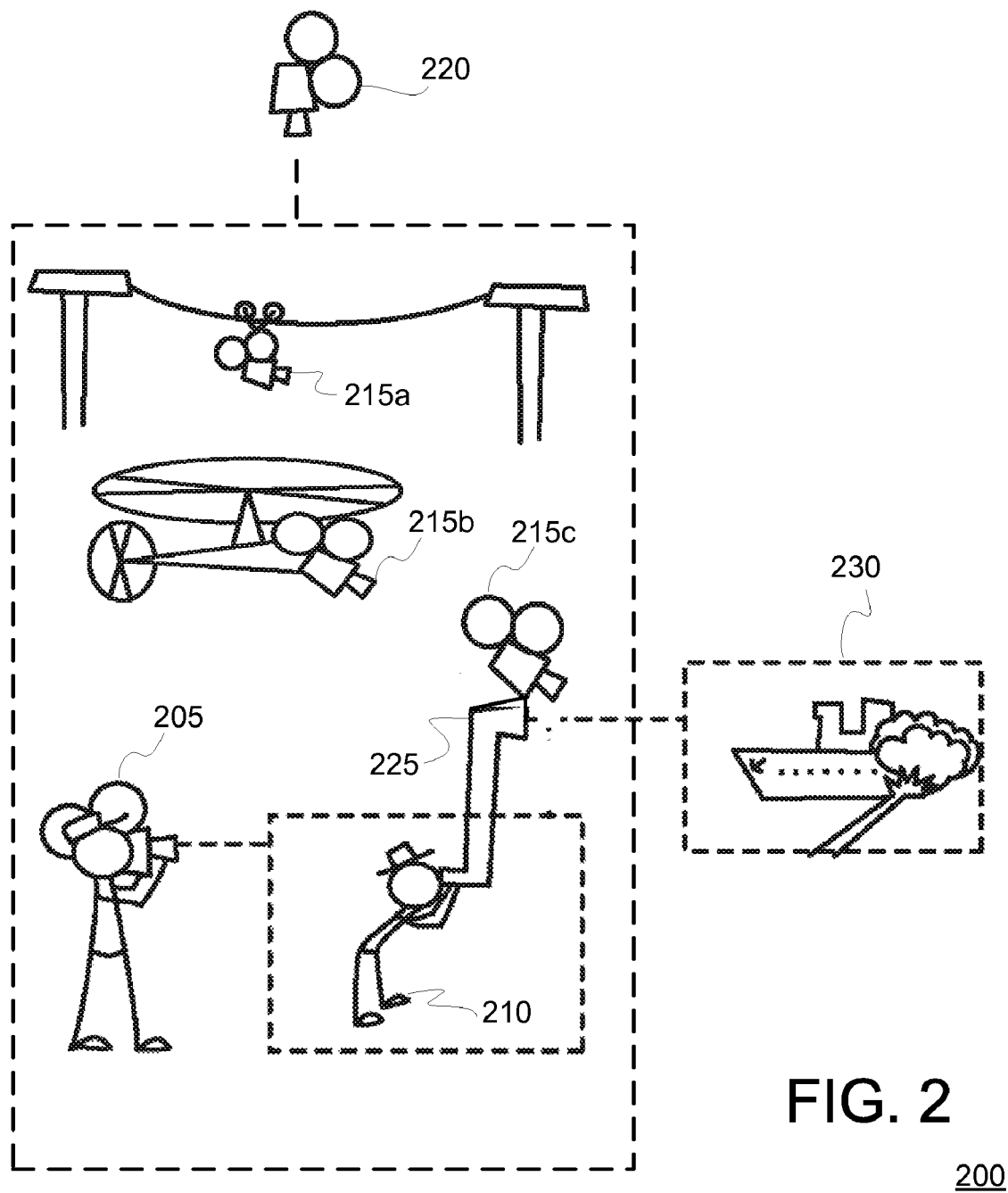
FIG. 2 illustrates a camera navigation system, according to one embodiment of the invention.

FIG. 2 illustrates a camera navigation system 200, according to one embodiment of the invention. Camera navigation system 200 includes a main rendering camera 205 which follows a character 210, one or more special case cameras 215 which provide alternate views to complement main rendering camera 205, and a debugging camera 220. Camera navigation system 200 may include a plurality of main rendering cameras 205, where each main rendering camera 205 may be associated with other characters (not shown). In one embodiment of the invention, CPU 112 assigns different priority levels to cameras 205 and 215. For example, CPU 112 may assign a highest priority level to main rendering camera 205. Any camera assigned the highest priority level is always running (i.e., actively tracking and viewing a scene), but may be preempted as the scene is viewed by other cameras assigned lower priority levels.

For example, main rendering camera 205 may be viewing character 210 on board a submarine walking towards a periscope 225. Then, CPU 112 cuts to special case camera 215$b$ for an aerial view of a ship 230 and portion of periscope 225 above an ocean's surface (not shown). Next, CPU 112 cuts to main rendering camera 205 for a view of character 210 peering through periscope 225. Since main rendering camera 205 is always tracking character 210, even when main camera 205's view is not rendered for display (such as when the aerial view captured by special case camera 215$b$ is rendered for display), CPU 112 can instantaneously cut from a display of the view captured by special case camera 215$b$ to a display of the view of character 210 at periscope 225 rendered by main camera 205 without hesitation or pause in the displayed views. In other words, a cut or a blend from special case camera 215$b$ to main rendering camera 205 can occur smoothly, since main rendering camera 205 is continuously running, and since the lower priority level cameras have prioritized entry points into main rendering camera 205. If main rendering camera 205 was not continuously running, then state variables associated with main rendering camera 205 would need to be stored to and retrieved from a stack or some other game memory structure upon termination and initiation of main rendering camera 205, respectively. This process of storing and retrieving state variables as a scene is viewed by different cameras can introduce delays into rendering and display of the scene.

In another embodiment of the invention, electronic entertainment system 100 is configured with a joystick driven debugging camera 220 that allows players to observe location and behavior of cameras 205 and 215, and to permit the players to make adjustments to cameras 205 and 215, if so desired.

In another embodiment of the invention, electronic entertainment system 100 selects positions for cameras 205 and 215 such that a player can clearly see character 210 or any other action or scene. Camera position is comprised of two parts: camera location and camera orientation. In this embodiment of the invention, camera location is independent of camera orientation. Poor camera location may eliminate a player's line-of-sight view of character 210, for example. Camera location as associated with various camera navigation configurations will be discussed further below in conjunction with FIGS. 4A-4E. Once system 100 has selected a camera navigation configuration, system 100 then controls camera orientation and rotation to enable the player to follow character 210 or any other game actions without player disorientation.

Figure 3:
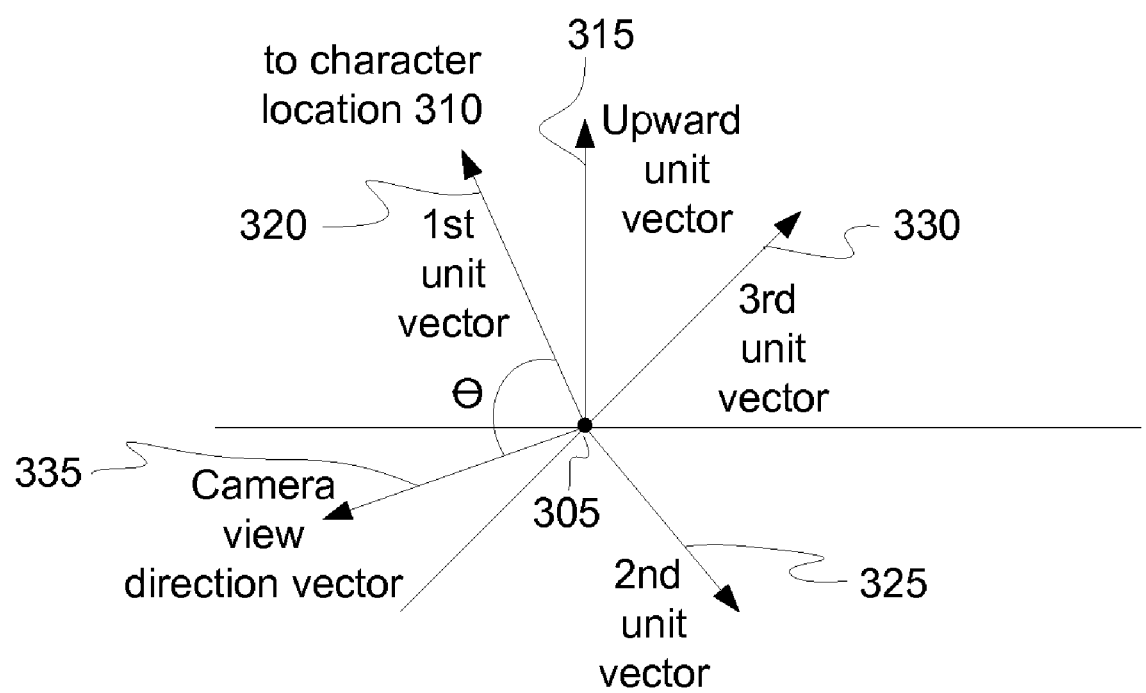
FIG. 3 illustrates a coordinate system used to define a camera rotation matrix, according to one embodiment of the invention.

FIG. 3 illustrates a coordinate system used to define a camera rotation matrix, according to one embodiment of the invention. System 100 builds a camera rotation matrix (not shown) that describes camera orientation using three orthogonal unit vectors. In order to build the camera rotation matrix, system 100 uses a camera location 305, a character location 310, and an upward unit vector 315. Upward unit vector 315 is directed anti-parallel (i.e., in an opposite direction) to a gravitational field vector (not shown). A first unit vector 320 is directed from camera location 305 to character location 310. A second unit vector 325 is a vector cross product of upward unit vector 315 with first unit vector 320. A third unit vector 330 is the vector cross product of first unit vector 320 with second unit vector 325. System 100 can now define any orientation of cameras 205 and 215 (FIG. 2) by rotation angles about three axes defined by orthogonal unit vectors 320, 325, and 330. For example, to specify a given orientation for camera 205, system 100 defines a set of rotation angles which comprise the camera rotation matrix.

In one embodiment of the invention, system 100 uses the camera rotation matrix to slow down rotation of camera 205 as a distance between camera 205 and character 210, for example, becomes small. Slowing rotation speed of camera 205 as the distance between camera 205 and character 210 becomes small prevents rapid, camera-induced motion of a rendered display that may otherwise disorient a player viewing the display. According to the invention, a method to slow camera rotation speed is to use the camera rotation matrix to interpolate an angle θ, where θ is defined between a camera view direction vector 335 and first unit vector 320. Camera view direction vector 335 is oriented along a direction that camera 205, located at camera location 305, is pointed. When the angle θ between camera view direction vector 335 and first unit vector 320 is interpolated into smaller angular increments (not shown), system 100 may reorient camera 205 according to the smaller angular increments, thus decreasing camera 205's rotation speed.

Slow rotation of camera 205 combined with small changes in camera location 305 can be combined to smoothly blend from a first camera view of character 210 to a second camera view of character 210.

Figure 4A:
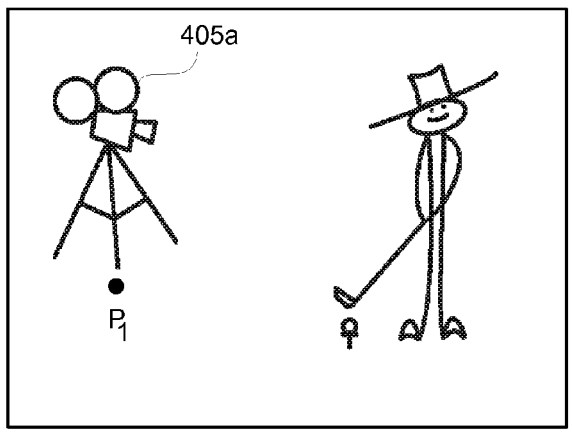
FIG. 4A illustrates a fixed point configuration for a special case camera, according to one embodiment of the invention.

FIGS. 4A-4E illustrate camera navigation configurations for special case cameras 215 (FIG. 2). Typically, main rendering camera 205 (FIG. 2) follows character 210 (FIG. 2), and special case cameras 215 (FIG. 2) are specifically configured to capture alternate views or views not accessible to main rendering camera 205. FIG. 4A illustrates a fixed point configuration for a special case camera 405a, according to one embodiment of the invention. In the FIG. 4 exemplary embodiment, special case camera 405a is located at a fixed point $P_1$ on a golf course. Although camera 405a may rotate, camera 405a may not change location, and consequently camera 405a is prevented from moving through obstacles (not shown) by the nature of its function.

Figure 4B:
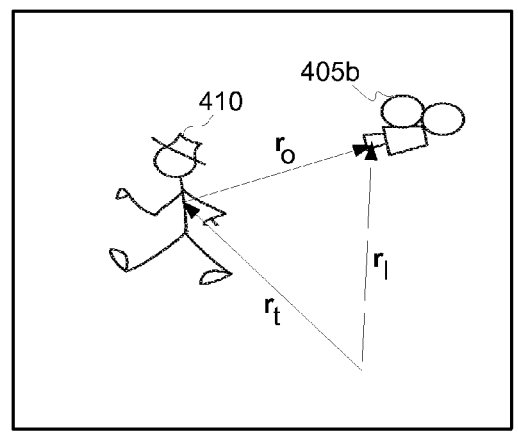
FIG. 4B illustrates a fixed offset configuration for a special case camera, according to one embodiment of the invention.

FIG. 4B illustrates a fixed offset configuration for a special case camera 405b, according to one embodiment of the invention. Special case camera 405b is configured to maintain a fixed offset vector $r_o$ from a target 410. In other words, a location of camera 405b is defined by a vector relation $r_l=r_t+r_o$, where $r_l$ is a location vector of special case camera 405b, and $r_t$ is a location vector of target 410. As an exemplary embodiment of the invention, system 100 may use special case camera 405b to view target 410 walking around a catwalk (not shown), for example.

Figure 4C:
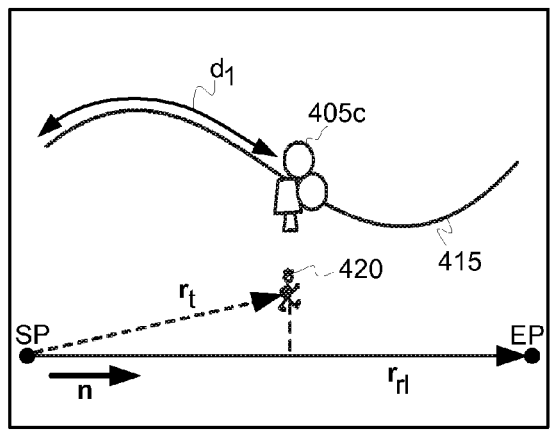
FIG. 4C illustrates a first indexing configuration for a special case camera, according to one embodiment of the invention.

FIG. 4C illustrates a first indexing configuration for a special case camera 405c, according to one embodiment of the invention. FIG. 4C includes a spline 415, a target 420, a reference line vector $r_{rl}$ directed from a start point SP to an end point EP, a target location vector $r_t$ directed from the start point SP to target 420, and a unit vector n directed along reference line vector $r_{rl}$. System 100 indexes a location $d_1$ of special case camera 405c along spline 415 to a projection of the target location vector $r_t$ along the reference line vector $r_{rl}$. For example, the location of special case camera 405c along spline 415 may be a function f of a parameter t, where t is a normalized component of $r_t$ along the reference line vector $r_{rl}$. In an exemplary embodiment of the invention, $d_1=f(t)$, where $t=(r_t \cdot n)/|r_{rl}|$. The scope of the invention covers any function f.

Figure 4D:
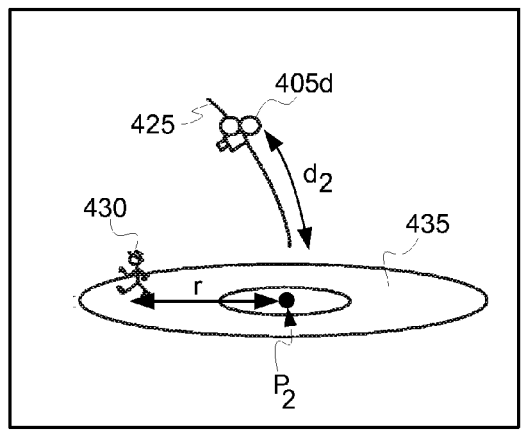
FIG. 4D illustrates a second indexing configuration for a special case camera, according to one embodiment of the invention.

FIG. 4D illustrates a second indexing configuration for a special case camera 405d, according to one embodiment of the invention. FIG. 4D includes a spline 425, a target 430, a point $P_2$, and a distance r between target 430 and the point $P_2$. System 100 indexes a location $d_2$ of special case camera 405d along spline 425 to the distance r between target 430 and the point $P_2$. In an exemplary embodiment of the invention, the location $d_2$ of special case camera 405d along spline 425 is a function g of the distance r, where $d_2=g(r)$. The scope of the invention covers any function g. Although the FIG. 4D embodiment of the invention illustrates target 430 constrained to a plane 435, the scope of the invention covers any three dimensional displacement of target 430 relative to the point $P_2$. For example, target 430 may be located at any point on a spherical shell of radius r centered about the point $P_2$.

Figure 4E:
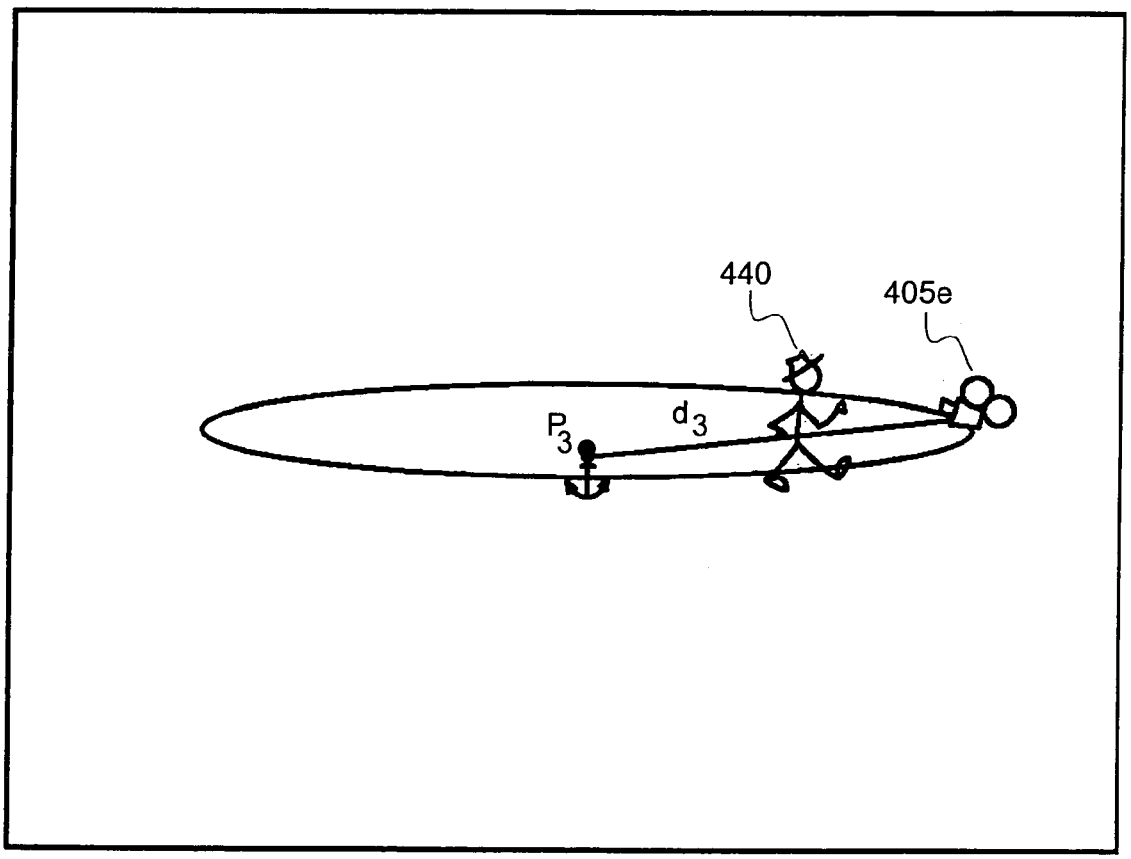
FIG. 4E illustrates an anchor point configuration for a special case camera, according to one embodiment of the invention.

FIG. 4E illustrates an anchor point configuration for a special case camera 405e, according to one embodiment of the invention. System 100 locates special case camera 405e at a given fixed distance $d_3$ from an anchor point $P_3$, such that a target 440 is along a line-of-sight between camera 405e and the anchor point $P_3$. The scope of the invention covers target 440 located anywhere in a three-dimensional space about anchor point $P_3$. For example, when target 440 moves anywhere in the three-dimensional space surrounding the anchor point $P_3$, special case camera 405e moves along a spherical shell (not shown) surrounding the anchor point $P_3$ such that target 440 is between special case camera 405e and the anchor point $P_3$. In an alternate embodiment of the invention, camera 405e may be configured to move along the spherical shell such that camera 405e is between the anchor point $P_3$ and target 440.

Figure 5:
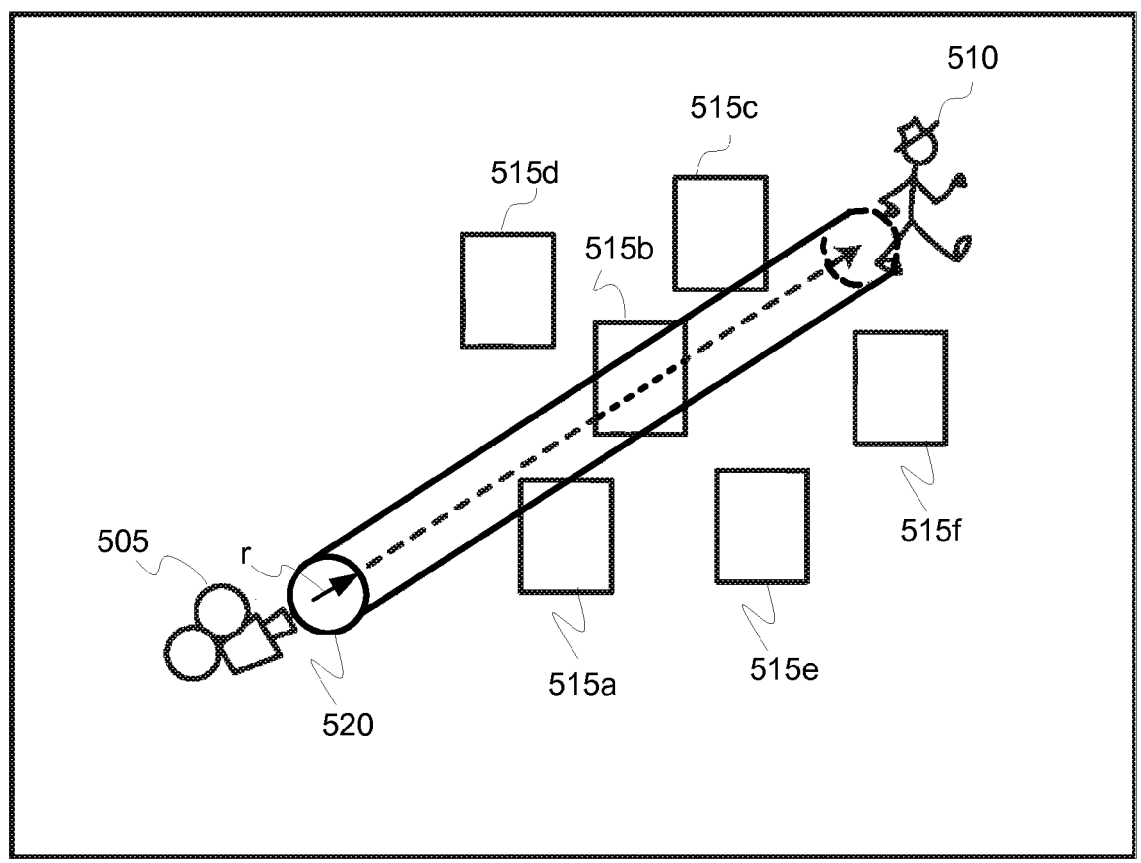
FIG. 5 illustrates detection of line-of-sight obstacles, according to one embodiment of the invention.

FIG. 5 illustrates detection of line-of-sight obstacles, according to one embodiment of the invention. FIG. 5 includes a main camera 505, a target 510, one or more obstacles 515, and a spherical collision probe 520. Since main camera 505 is following target 510, it is preferred that main camera 505 generally avoid obstacles 515 to keep game action associated with target 510 in view for a player. However, obstacles 515 may break a line-of-sight between main camera 505 and target 510, particularly in games with complex terrain, for example. In operation, system 100 sends spherical collision probe 520 with a predetermined radius r along the line-of-sight connecting main camera 505 to target 510 to determine if the line-of-sight is broken.

If spherical collision probe 520 does not intersect any obstacles 515, then the line-of-sight is unobstructed and system 100 does not employ any line-of-sight restoration methods. However, if spherical collision probe 520 intersects one or more obstacles 515, such as obstacles 515a-515c, then the line-of-sight path is obstructed, and system 100 initiates one or more line-of-sight restoration methods. Line-of-sight restoration methods are discussed further below in conjunction with FIGS. 6-9.

Figure 6A:
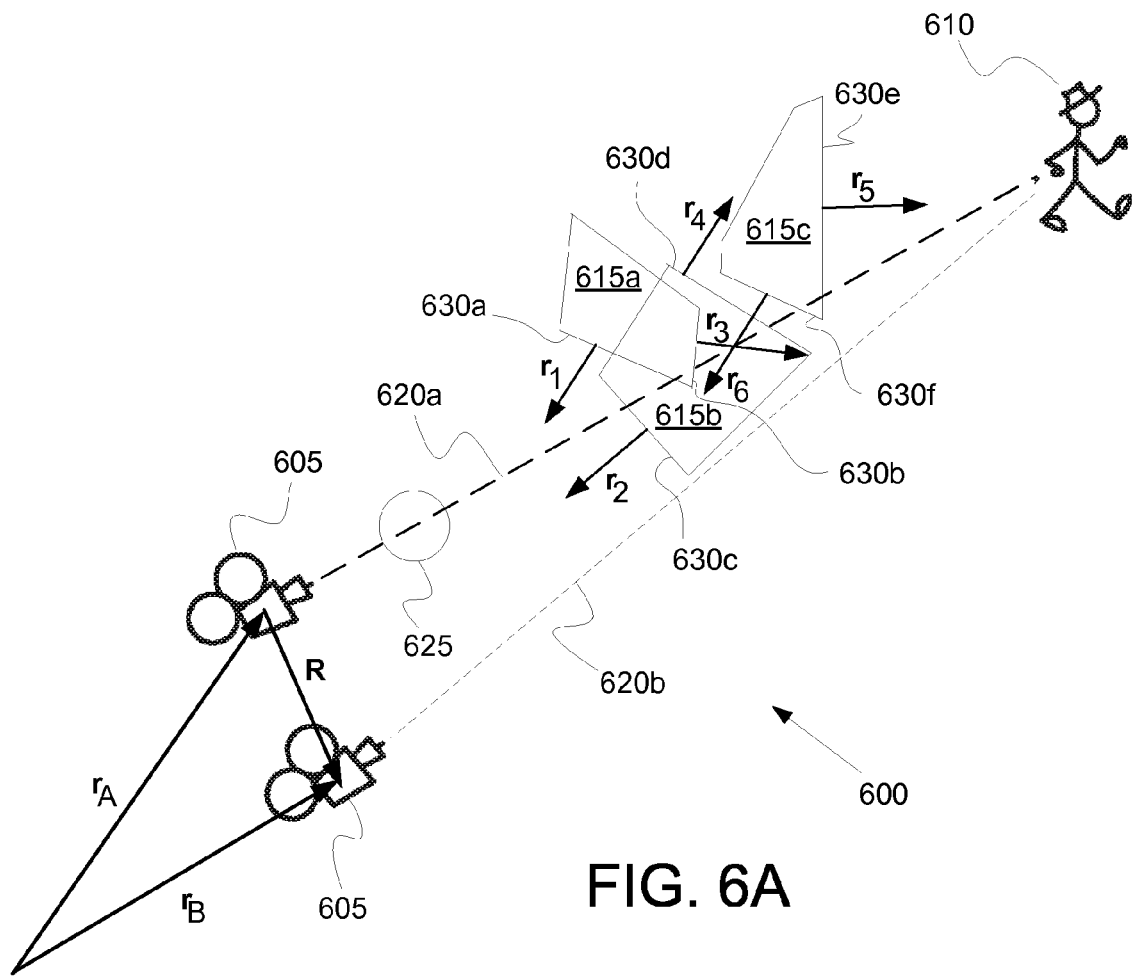
FIG. 6A illustrates a first line-of-sight restoration method, according to one embodiment of the invention.

FIG. 6A illustrates a first line-of-sight restoration method 600, according to one embodiment of the invention. Line-of-sight restoration method 600 restores a line-of-sight between a main camera 605 located at a position vector $r_A$ and a target 610 by first computing a resultant displacement vector R, and then relocating main camera 605 to a position vector $r_B=r_A+R$. In operation, system 100 constructs a straight line 620a from camera 605 located at position vector $r_A$ to target 610 that passes through a center of a collision probe 625. In this exemplary embodiment of the invention, straight line 620a intersects one or more polygonal sides 630 of one or more objects 615, where each object 615 is typically constructed from multiple polygonal sides 630. Next, system 100 associates a unit normal vector r with each polygon side 630 that is intersected by straight line 620a.

Figure 6B:
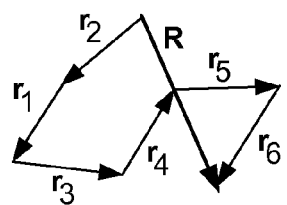
FIG. 6B illustrates a resultant displacement vector R as a sum of unit normal vectors r, according to one embodiment of the invention.

FIG. 6B illustrates the resultant displacement vector R as a sum of the unit normal vectors r, according to one embodiment of the invention. In operation, system 100 adds the unit normal vectors r to generate the resultant vector R. That is, $R=r_1+r_2+r_3+r_4+r_5+r_6$, where $r_1$ and $r_3$ are unit vectors normal to polygonal sides 630a and 630b, respectively, of object 615a intersected by straight line 620a, $r_2$ and $r_4$ are unit vectors normal to polygonal sides 630c and 630d, respectively, of object 615b intersected by straight line 620a, and $r_5$ and $r_6$ are unit vectors normal to polygonal sides 630e and 630f, respectively, of object 615c intersected by straight line 620a. Referring back to FIG. 6A, system 100 relocates camera 605 to position vector $r_B=r_A+R$. Typically, a new line-of-sight along a straight line 620b is unobstructed by obstacles 615a-615c. However, other obstacles may obstruct the new line-of-sight, and if so, system 100 may repeat the first line-of-sight restoration method 600 or use other line-of-sight restoration methods.

Figure 7:
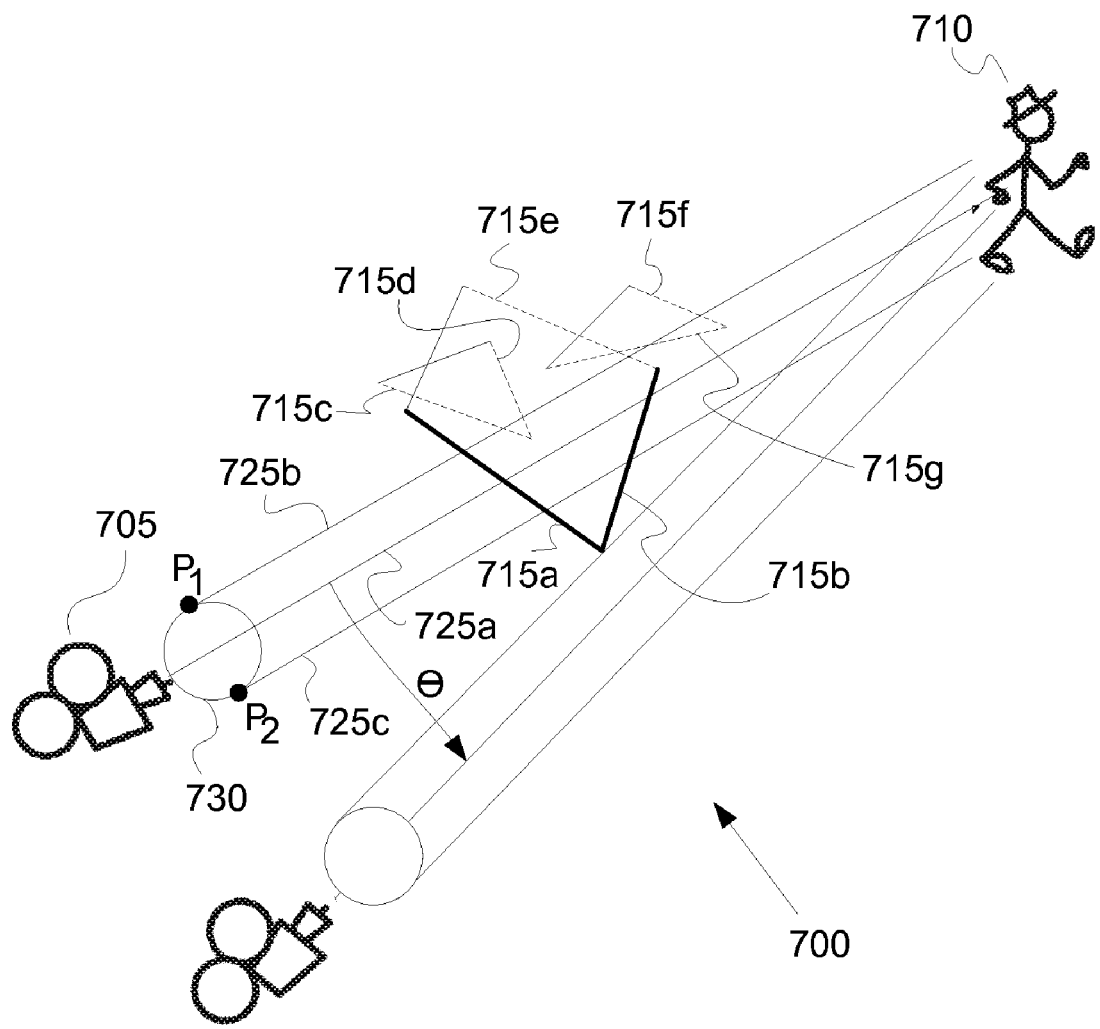
FIG. 7 illustrates a second line-of site restoration method, according to one embodiment of the invention.

FIG. 7 illustrates a second line-of site restoration method 700, according to one embodiment of the invention. Line-of-sight restoration method 700 restores a line-of-sight between a main camera 705 and a target 710 by rotating main camera 705 either counterclockwise or clockwise about target 710, based upon classifying polygonal sides 715a-715g intersected by lines 725 constructed from camera 705 to target 710. In one embodiment of the invention, system 100 classifies polygonal sides 715a-715g into groups such as "clockwise," "counter-clockwise," "straddling," "above," and "below." In addition, any polygonal side 715 may be classified into one or more groups.

In operation, system 100 constructs three rays 725a-725c from camera 705 to target 710, where a first ray 725a passes through a center of a collision probe 730, a second ray 725b is constructed parallel to first ray 725a and is tangent to collision probe 730 at a first point $P_1$ on a circumference of collision probe 730, and a third ray 725c is constructed parallel to first ray 725a and is tangent to a second point $P_2$ on the circumference of collision probe 730. Rays 725a-725c may intersect one or more polygonal sides 715 comprising one or more objects.

For example, if first ray 725a and second ray 725b and/or third ray 725c intersect a same polygonal side 715, then system 100 classifies that polygonal side 715 as "straddling." In the FIG. 7 embodiment of the invention, system 100 classifies polygonal sides 715a and 715b as "straddling," since rays 725a, 725b, and 725c intersect polygonal side 715a and rays 725a and 725c intersect polygonal side 715b.

Furthermore, if a given polygonal side 715 is intersected only by second ray 725b, then system 100 classifies the given polygonal side 715 as "clockwise," since system 100 may rotate main camera 705 counterclockwise to eliminate the given polygonal side 715 from the line-of-sight. For example, system 100 classifies polygonal sides 715c-715g as "clockwise," since each polygonal side 715c-715g is intersected only by second ray 725b. Thus, system 100 may remove polygonal sides 715c-715g from the line-of-sight by rotating main camera 705 counterclockwise through an angle θ.

Alternatively, if other polygonal sides (not shown) are intersected only by third ray 725c, then system 100 classifies the other polygonal sides as "counterclockwise," since system 100 may rotate camera 705 clockwise to eliminate the other polygonal sides from the line-of-sight. In addition, system 100 may use other rays (not shown) to determine if polygonal sides 715 should be classified as "above" or "below." For example, if system 100 classifies polygonal side 715a as "above," then system 100 rotates camera 705 into plane (i.e., below plane) of FIG. 7 to remove polygonal side 715a from the line-of-sight. However, if system 100 classifies polygonal side 715a as "below," then system 100 rotates camera 705 out of plane (i.e., above plane) of FIG. 7 to remove polygonal side 715a from the line-of-sight.

According to the invention, if system 100 detects only clockwise polygonal sides or clockwise and straddling polygonal sides, then system 100 can restore a line-of-sight to target 710 by rotating camera 705 counterclockwise until system 100 does not detect any clockwise and straddling polygonal sides. Similarly, if system 100 detects only counterclockwise polygonal sides or counterclockwise and straddling polygonal sides, then system 100 can restore the line-of-sight view to target 710 by rotating camera 705 clockwise. In addition, if system 100 detects counterclockwise and clockwise polygonal sides and does not detect straddling polygonal sides, then camera 705 is looking between the counterclockwise and clockwise polygonal sides, and system 100 does not rotate camera 705.

Figure 8:
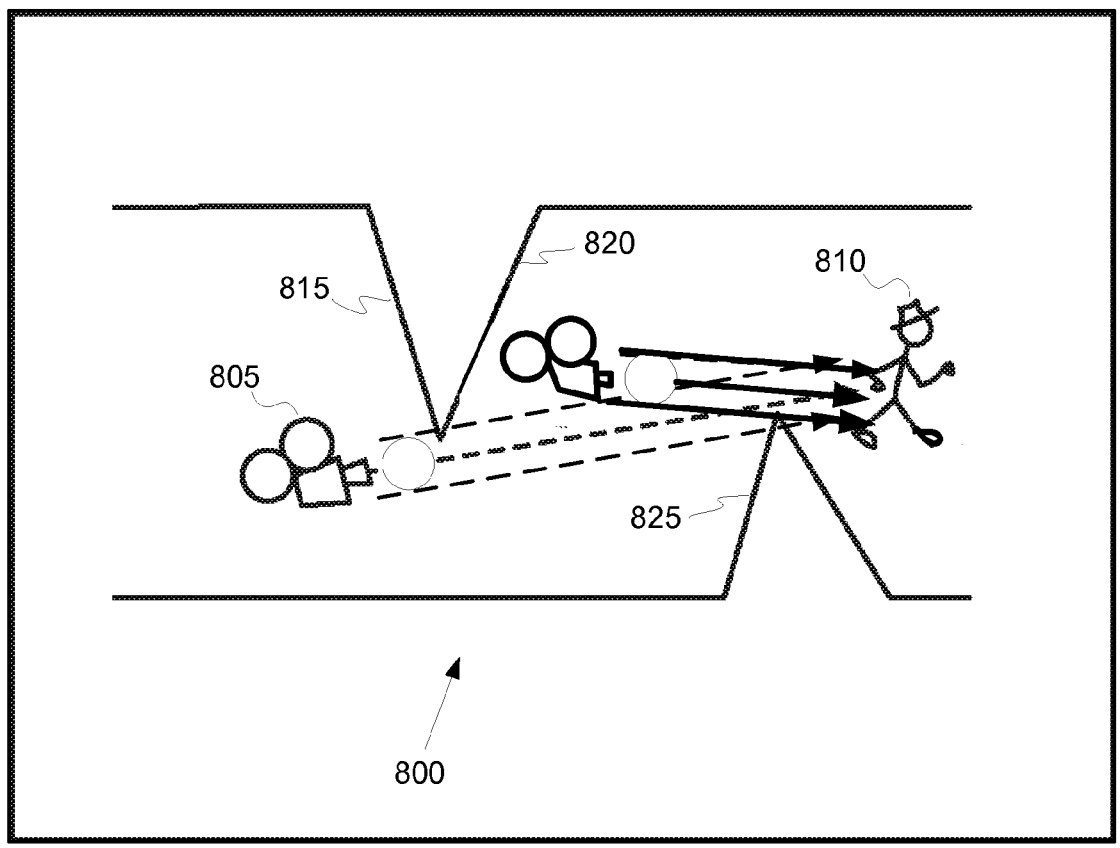
FIG. 8 illustrates a third line-of site restoration method, according to one embodiment of the invention.

FIG. 8 illustrates a third line-of-sight restoration method 800, according to one embodiment of the invention. Line-of-sight restoration method 800 improves a line-of-sight view of a target 810 at least partially obstructed by clockwise polygonal sides 815 and 820, and a counterclockwise polygonal side 825, by first decreasing a distance between a camera 805 and target 810, and then rotating camera 805 about target 810 to restore an improved line-of-sight view of target 810. System 100 may use third line-of-sight restoration method 800 when the line-of-sight view of target 810 is partially blocked by at least one counterclockwise polygonal side (e.g., counterclockwise polygonal side 825) and at least one clockwise polygonal side (e.g., clockwise polygonal side 815 or 820), but is unobstructed by any straddling polygonal sides (i.e., camera 805 views target 810 between two objects comprised of clockwise and counterclockwise polygonal sides).

For example, according to the FIG. 8 embodiment of the invention, system 100 first detects clockwise polygonal sides 815 and 820, and counterclockwise polygonal side 825. Then, system 100 determines a first distance and a second distance from camera 805 to clockwise polygonal sides 815 and 820, respectively, and a third distance from camera 805 to counterclockwise polygonal side 825. Using the first, second, and third distances, system 100 relocates camera 805 such that camera 805 is located between clockwise polygonal side 820 and counterclockwise polygonal side 825. Finally, system 100 uses second line-of-sight restoration method 700 (FIG. 7) to rotate camera 805 about target 810 such that a new, improved line-of-sight view of target 810 is generated.

Figure 9:
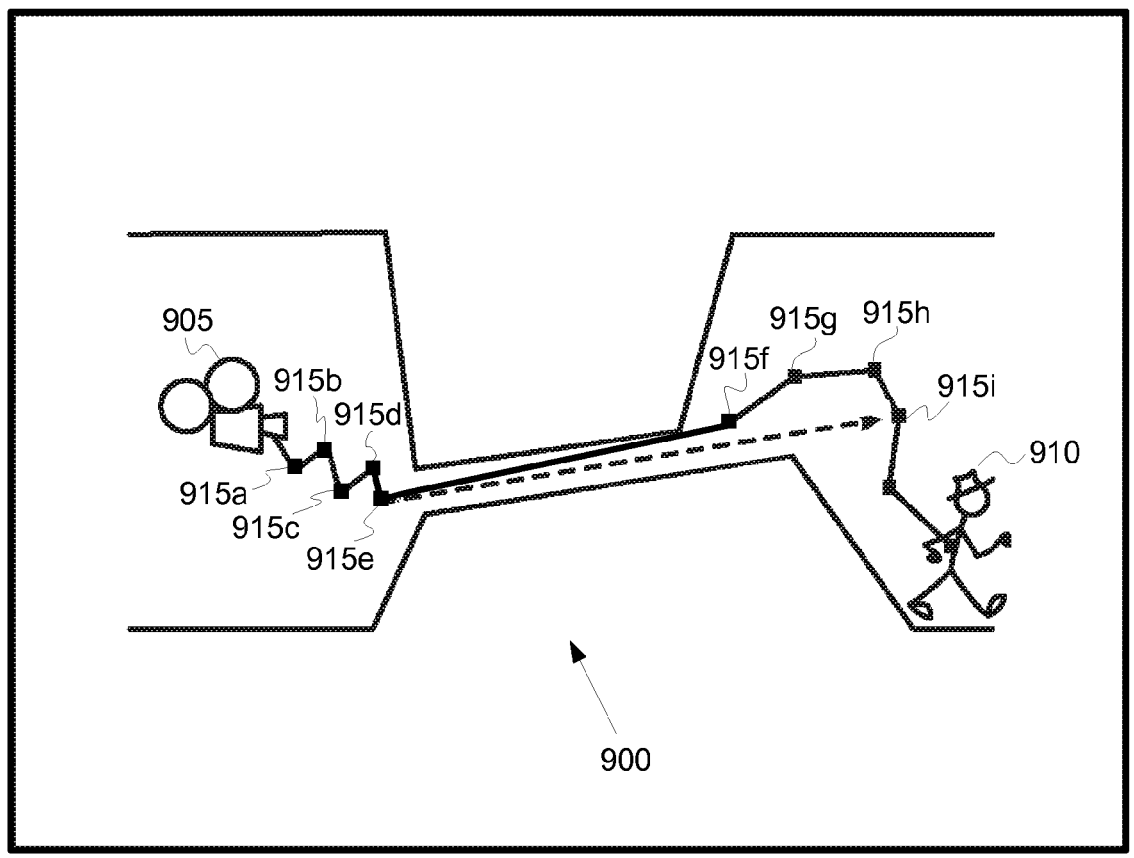
FIG. 9 illustrates an emergency line-of-sight restoration method, according to one embodiment of the invention.

FIG. 9 illustrates an emergency line-of-sight restoration method 900, according to one embodiment of the invention. If a main camera 905 loses a line-of-sight with a target 910 (i.e., line-of-sight between camera 905 and target 910 is obstructed), and if system 100 is not able to recover an unobstructed line-of-sight by any methods disclosed herein, such as line-of-sight restoration methods 600 (FIG. 6), 700 (FIG. 7), and 800 (FIG. 8), then system 100 moves camera 905 sequentially along a series of old target locations 915a-915e. If, after a predetermined time interval or a predetermined number of old target locations 915, camera 905 does not have an unobstructed view of target 910, then system 100 may relocate camera 905 to an old target location 915i, for example, more recently occupied by target 910 than old target locations 915a-915e. If necessary, system 100 may repeat relocating camera 905 to other more recently occupied target locations (not shown) until an unobstructed line-of-sight view of target 910 is found. Moving camera 905 to old target locations 915a-915e or to a more recently occupied target location 915i may quickly restore unobstructed line-of-sight views of target 910 and allow players to follow target 910 through complex structures, such as long narrow corridors, windows, and holes in floors.

Figure 10:
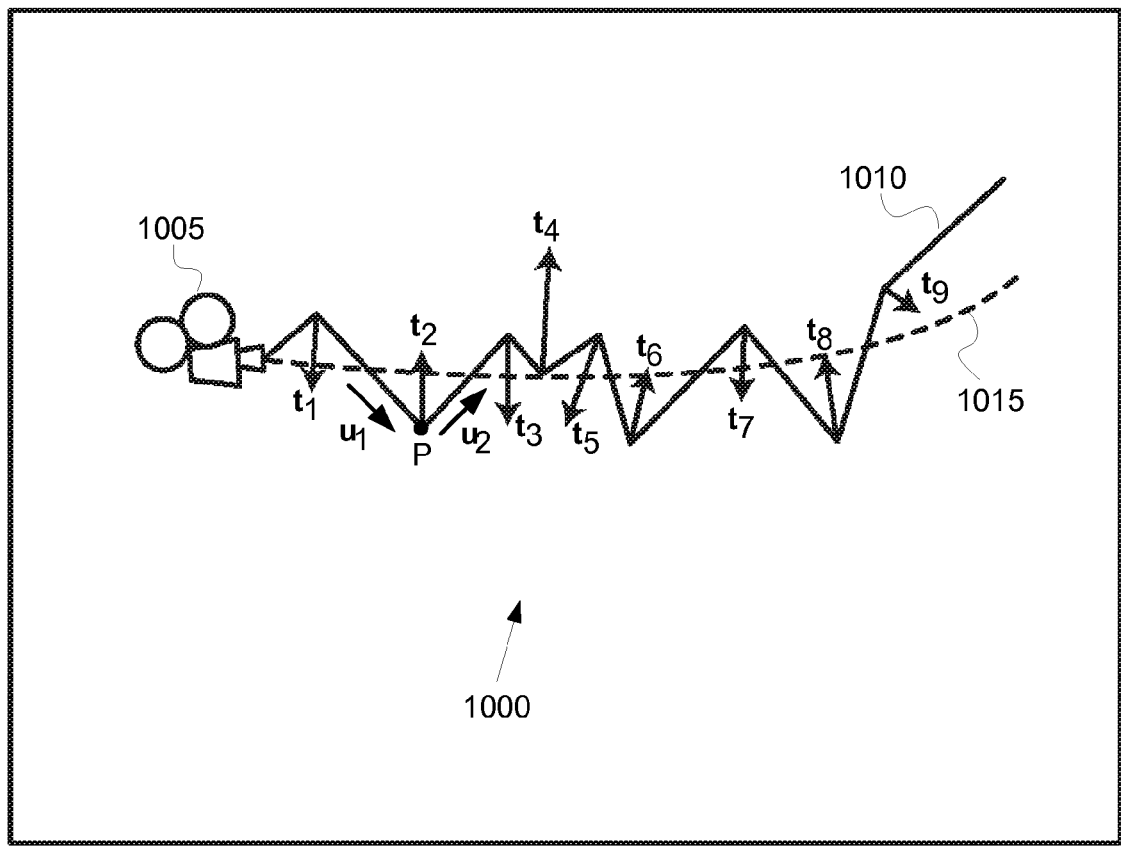
FIG. 10 illustrates camera path smoothing, according to one embodiment of the invention.

FIG. 10 illustrates camera path smoothing 1000, according to one embodiment of the invention. FIG. 10 includes a main camera 1005, a main camera navigation path 1010, a smoothed navigation path 1015, and multiple velocity attenuation vectors t. In the FIG. 10 embodiment of the invention, main camera navigation path 1010 is wiggly. The wiggling of main camera navigation path 1010 may be a result of system 100 using first line-of-sight restoration method 600 (FIG. 6A), second line-of-sight restoration method 700 (FIG. 7), third line-of-sight restoration method 800 (FIG. 8), emergency line-of-sight restoration method 900 (FIG. 9), or any combination of restoration methods 600, 700, 800, and 900.

In one embodiment of the invention, system 100 computes the multiple velocity attenuation vectors t at points along main camera navigation path 1010, determines if any of the multiple velocity attenuation vectors t require scaling and performs any required scaling, and attenuates a velocity of main camera 1005 at each point along main camera navigation path 1010 by adding an associated velocity attenuation vector t to the velocity of main camera 1005. Thus, camera path smoothing 1000 generates smoothed camera navigation path 1015 for camera tracking that reduces abrupt changes in camera velocity and player disorientation.

In operation, system 100 computes a velocity attenuation vector $t_2$, for example, at a point P by subtracting a first unit velocity vector $u_1$ associated with motion of main camera 1005 along main camera navigation path 1010 prior to point P from a second unit velocity vector $u_2$ associated with motion of main camera 1005 along main camera navigation path 1010 subsequent to point P. That is, system 100 computes $t_2 = u_2 - u_1$, where $u_1 = v_1/|v_1|$, $u_2 = v_2/|v_2|$, and $v_1$ is a velocity of main camera 1005 prior to point P and $v_2$ is a velocity of main camera 1005 subsequent to point P. System 100 computes other velocity attenuation vectors t in a similar manner. Next, system 100 computes an average velocity $v_P$ of main camera 1005 at point P for main camera 1005 moving along main camera navigation path 1010. In one embodiment of the invention, the average velocity $v_P$ at point P is an average of main camera 1005's velocity $v_1$ prior to point P and main camera 1005's velocity $v_2$ subsequent to point P, such that $v_P = (v_1 + v_2)/2$.

Subsequently, system 100 computes a vector dot product $v_P \cdot t_2$. If system 100 determines that $v_P \cdot t_2$ is greater than or equal to zero, then $v_P$ does not have a vector component directed opposite vector $t_2$, and consequently system 100 does not attenuate average velocity $v_p$ of main camera 1005. Therefore, system 100 generates a new average velocity $v_p^{new}$ that is identical to the average velocity $v_p$ (i.e., $v_p^{new} = v_p$). However, if system 100 determines that $v_P \cdot t_2$ is less than zero, then system 100 computes an amount of attenuation to be applied to $v_p$. In a first case, if a magnitude of the vector component of $v_p$ directed opposite $t_2$ is less than the magnitude of $t_2$ (i.e., $|(v_P \cdot t_2)/t_2| < |t_2|$), then system 100 attenuates $v_p$ by the vector component of $v_p$ directed opposite $t_2$ to generate the $v_p^{new}$. That is, $v_p^{new} = v_p + (v_P \cdot t_1)/t_1$.

In a second case, if the magnitude of the vector component of $v_p$ directed opposite of $t_2$ is greater than or equal to the magnitude of $t_2$ (i.e., $|(v_P \cdot t_2)/t_2| \geq |t_2|$), then system 100 attenuates $v_p$ by $t_2$ to generate the $v_p^{new}$. That is, $v_p^{new} = v_p + t_2$. Finally, upon generation of the new average velocity vectors $v_p^{new}$ of main camera 1005 at all points along main camera navigation path 1010, system 100 uses the new average velocity vectors $v_p^{new}$ and main camera navigation path 1010 to construct smoothed navigation path 1015 for camera tracking.

The invention has been explained above with reference to several embodiments. Other embodiments will be apparent to those skilled in the art in light of this disclosure. The present invention may readily be implemented using configurations other than those described in the embodiments above. Additionally, the present invention may effectively be used in conjunction with systems other than those described in the embodiments above. Therefore, these and other variations upon the disclosed embodiments are intended to be covered by the present invention, which is limited only by the appended claims.

What is claimed is:

1. A system for rendering unobstructed views in a gaming environment, comprising:
    a memory that stores a camera navigation/control model;
    a central processing unit that selects a camera position for:
        avoiding an object that obstructs a line-of-sight view of a target in accordance with the camera navigation/control model,
        building a camera rotational matrix based on camera location, character location, and an upward unit vector; and
    a graphics processing unit that renders an unobstructed view of the target in an image for display, the unobstructed view captured by the camera at the selected camera position.

2. The system of claim 1, wherein the camera position is a camera orientation described by a camera rotation matrix.

3. The system of claim 2, wherein the central processing unit uses the camera rotation matrix to slow down a camera rotation speed as a distance between the camera and the target decreases.

4. The system of claim 1, wherein the camera position is a camera navigation configuration.

5. The system of claim 1, wherein the central processing unit further detects objects which obstruct the line-of-sight of the target and moves the camera according to one or more line-of-sight restoration methods to provide the unobstructed view of the target.

6. A method for rendering unobstructed views in a gaming environment, the method comprising:
    storing a camera navigation/control model;
    building a camera rotational matrix based on camera location, character location, and an upward unit vector;
    selecting a camera position for avoiding an object that obstructs a line-of-sight view of a target in accordance with a stored camera navigation/control model;
    rendering an unobstructed view of the target;
    capturing the unobstructed view of the target; and
    displaying the unobstructed view of the target.

7. The method of claim 6, wherein selecting the camera position further comprises describing a camera orientation using a camera rotation matrix.

8. The method of claim 7, wherein selecting the camera position further comprises using the camera rotation matrix to slow down a camera rotation speed as a distance between the camera and the target decreases.

9. The method of claim 6, wherein the camera position is a camera navigation configuration.

10. The method of claim 6, further comprising detecting objects which obstruct the line-of-sight of the target and moving the camera according to one or more line-of-sight restoration methods to provide the unobstructed view of the target.

11. The method of claim 10, wherein providing the unobstructed view of the target comprising moving the camera sequentially based on a series of old target locations until the unobstructed view of the target is found.

12. A non-transitory computer-readable storage medium, having embodied thereon a program, the program being executable by a processor to perform a method for rendering unobstructed views in a gaming environment, the method comprising:
    storing a camera navigation/control model;
    building a camera rotational matrix based on camera location, character location, and an upward unit vector
    selecting a camera position for avoiding objects which obstruct an object that obstructs a line-of-sight view of a target in accordance with the camera navigation/control model;
    rendering an unobstructed view of the target;

capturing the unobstructed view of the target; and
displaying the unobstructed view of the target.

13. The non-transitory computer-readable storage medium of claim 12, wherein selecting the camera position further comprises describing a camera orientation using a camera rotational matrix.

14. The non-transitory computer-readable storage medium of claim 13, wherein selecting the camera position further comprises using the camera rotation matrix to slow down a camera rotation speed as a distance between the camera and the target decreases.

15. The non-transitory computer-readable storage medium of claim 12, wherein the camera position is a camera navigation configuration.

16. The non-transitory computer-readable storage medium of claim 12, wherein the program is further executable to detect objects which obstruct the line-of-sight of the target and to move the camera according to one or more line-of-sight restoration methods to provide the unobstructed view of the target.

17. The non-transitory computer-readable storage medium of claim 12, wherein the program is further executable to move the camera position sequentially based on a series of old target locations until the unobstructed view of the target is found.

* * * * *